Patented Jan. 16, 1945

2,367,569

UNITED STATES PATENT OFFICE 2,367,569

SYMMETRICAL HETEROCYCLIC DISUBSTITUTED ALKYLOL GUANIDINES

Walter P. Ericks, Stamford, and James H. Williams, Riverside, Conn., assignors to American Cyanamid Company, New York, N. Y., a corporation of Maine No Drawing. Application September 9, 1942, Serial No. 457,742

5 Claims. (Cl. 260—290)

This invention relates to the preparation of new and useful condensation products of alkylene oxides and symmetrical disubstituted guanidines.

More particularly, it embraces the preparation of condensation products obtained when alkylene oxides are reacted with guanidines having the general formula:

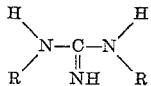

wherein both R's represent identical organic radicals which may be alkyl, aryl, aralkyl, alicyclic or heterocyclic radicals. Among the alkylene oxides which may be used herein are ethylene oxide, 1,2-propylene oxide, 1,3-propylene oxide, glycidol, glucosan, sugar anhydrides containing an ethylene oxide ring or compounds capable of yielding an intermediate containing an alkylene oxide ring in the course of the reaction, such as ethylene chlorohydrin, chloroglycerol, epichlorhydrin, and the like.

In particular, this case, being a continuation-in-part of the application bearing Serial No. 376,619 filed January 30, 1941, by Walter P. Ericks et al. for "Symmetrical disubstituted alkylol guanidines" relates more particularly to the symmetrically disubstituted heterocyclic guanidines.

It is an object of this invention to prepare these compounds cheaply and efficiently. A still further object is to prepare surface active materials which find use as textile and leather assistants and in the paper, lacquer, resin, cosmetic and similar industries as highly effective wetting, emulsifying and detergent agents. The products of this invention are especially useful for softening purposes as well as anti-crease and wrinkle prevention in cloth, leather, fabricoid and similar materials and are particularly valuable when used as alkali and acid resistant wetting, detergent and emulsifying agents, as well as for the resolution of emulsions such as petroleum-water emulsions. They also find use as mercerizing assistants. Among the compounds herein described, those containing aryl and heterocyclic substituents have the valuable faculty of inducing local anaesthesia when applied topically or injected subcutaneously. They also display effective vasco-constrictor properties and when used as such only a very small amount of the heterocyclic product is necessary. Further and more important uses are suggested in the following description.

With these objects in view and such others as may hereinafter appear, the invention consists in the novel products and processes described below and more particularly defined in the claims.

The compounds of this invention are prepared in general by reacting a symmetrical substituted guanidine with a compound containing an ethylene oxide ring. If desired the reaction may be accelerated by using a temperature of 150° to 200° C. and a suitable organic or inorganic base, preferably an alkali-metal or alkaline earth metal hydroxide such as sodium hydroxide, potassium hydroxide, calcium hydroxide, a pyridine and the like. Usually the reaction is exothermic and hence must be controlled as by the use of an efficient cooling device. The reaction product is then filtered, evaporated, and if necessary, further purified by solvent extraction. Instead of a compound containing an alkylene oxide ring, an epihalogenhydrin may be used, or a similar substance having a radical which under the conditions of the reaction forms an intermediate having an alkylene oxide ring.

The following examples illustrate the invention in still further detail:

EXAMPLE I

*Preparation of dipyridylthiourea*

1000 g. of 2-aminopyridine, 2700 g. of carbon disulfide and 5 g. of powdered sulfur were charged into a flask and refluxed on water bath for 48 hours. The carbon disulfide was distilled, leaving an orange-colored liquid as residue, which was diluted with 1000 ml. of alcohol. After the addition of 1000 ml. of water to the solution a precipitate formed. This was filtered off, resludged in 800 ml. of 50% aqueous alcohol, filtered and the crystals obtained were dried at room temperature for two days. The yield was 314 g. (M. P. 160°–161° C., literature 161° C.).

*Preparation of pure 1,3-di-pyridyl-2-ethylol-guanidine by fractional recrystallization*

345 g. of dipyridylthiourea, 3490 g. of basic lead carbonate, 114 g. of monoethanolamine and seven liters of absolute ethyl alcohol were stirred at 45°–50° C. for 16 hours until a test solution showed that the desulfurization was completed. The reaction mixture was filtered and the desulfurization was completed. The reaction mixture was filtered and the washings were evaporated to a volume of 800 ml. On cooling the solution to 30° C. a precipitate formed. This was filtered off and dried at room temperature. The yield was 78 g. (M. P. 94°–96° C.).

This precipitate was dissolved in 200 ml. of denatured alcohol. To the solution was added an equal volume of water with stirring. The precipitate which formed within a few minutes was filtered off and dried at room temperature. The yield was 62 g., having a M. P. of 99.5°–100° C. This product was analyzed for nitrogen. The results were as follows:

|  | Found | Calculated for $C_{13}H_{17}N_5O$ |
|---|---|---|
| Percent nitrogen | 27.13 | 27.25 |

Preparation of 1,3-di-pyridyl-2-ethylol guanidine hydrochloride 25.7 g. of 1,3-di(2-pyridyl)-2-ethylol guanidine was dissolved in 250 ml. of absolute ethyl alcohol and the solution was neutralized with a solution containing 9.1 g. of dry hydrogen chloride per 100 g. of solution. The precipitate was filtered off and washed once with absolute ethyl alcohol. It was dried at 40° C. for two hours and then at room temperature for 16 hours (yield 15.4 g.; M. P. 157°–159° C.). To the mother liquor was added 500 ml. of dry diethyl ether and an additional 4.3 g. of the product (M. P. 157°–159° C.) was obtained. Total yield 19.9 g. Analysis:

|  | Found | Calculated for— | |
|---|---|---|---|
|  |  | $C_{13}H_{17}N_5O.HCl.H_2O$ | $C_{13}H_{17}N_5O.HCl$ |
| Percent nitrogen | 22.4 | 22.4 | 23.8 |
| Percent hydrochloride | 11.7 | 11.7 | 12.4 |

The analytical data indicates that the 1,3-dipyridyl-2-ethylol guanidine hydrochloride absorbed some atmospheric moisture and formed the monohydrate.

Preparation of 1,3-di(2-pyridyl)-2-ethylol guanidine sulfate 25 g. of 1,3-di(2-pyridyl)-2-ethylol guanidine was dissolved in denatured alcohol. To the solution was added with stirring 50% aqueous sulfuric acid until the pH of the solution was 2. The precipitate which formed was filtered off, dissolved in cold water and then precipitated by adding two equivalent volumes of denatured alcohol and three volumes of diethyl ether. The crystals were dried at room temperature; M. P. 181°–182° C. The compound was also easily hydrolyzed. Analysis:

|  | Found | Calculated for $C_{13}H_{17}N_5O.H_2SO_4$ |
|---|---|---|
| Percent nitrogen | 19.5 | 19.7 |
| Percent sulfate | 26.9 | 27.0 |

EXAMPLE II

Preparation of 1,3-di-pyridyl-2-(2-butylol-1) guanidine 23.2 g. of di-pyridyl thiourea was dissolved in 400 ml. of absolute ethyl alcohol. To the solution was added 9.7 g. of 2-amino-1-butanol and 232 g. of basic lead carbonate. The mixture was agitated for 24 hours at 45°–50° C. It was then filtered and the filtrate was concentrated under reduced pressure until crystallization began to take place. The residue in the distilling flask was diluted with benzol and the crystals were filtered off. After drying the crystals weighed 3 g., M. P. 240°–241° C. The filtrate was mixed with water and the benzol and alcohol were distilled, leaving a viscous oil floating on the surface of the water. The oil was washed once with water, dried in a shallow dish at 60° C. overnight and was then analyzed for nitrogen. The results were as follows:

|  | Found | Calculated for $C_{15}H_{21}N_5O$ |
|---|---|---|
| Percent nitrogen | 23.6 | 24.6 |

EXAMPLE III 9.3 g. of dipyridyl thiourea, 31 g. of basic lead carbonate and 2.7 g. of ethanolamine were heated in alcohol at 45° C. for 10 hours with constant agitation. The product was then filtered and the filtrate evaporated to a relatively small volume, then cooled and the product separated by filtration. The filter cake, recrystallized from ethyl alcohol solution gave 1,3-dipyridyl-2-ethanol guanidine having a melting point of approximately 101° C. as a white amorphous powder. The salt may be readily obtained by dissolving this product in ethyl alcohol and neutralizing the solution with hydrochloric acid, whereupon the hydrochloride separates out upon the addition of ether. The hydrochloride is very soluble in water, slightly soluble in alcohol but insoluble in ether. The sulfate produced in a similar manner has corresponding properties and melts after recrystallization from alcohol at 174° to 175° C.

The 1,3-dipyridyl-2-alkylol substituted guanidines may be employed in various forms in order to take advantage of their local anesthetic activity. In many instances the compounds may be utilized as the free bases, for example, they may be applied locally in the form of a powder for the production of surface anesthesia or they may be applied in the form of emulsions as topical anesthetics. For topical application they may also be applied in admixture with or dissolved in ointment, bases, fatty acid glycerides, or the like. It has been known in the past that local anesthetics, as well as other therapeutic agents, may safely be utilized for some types of applications in solutions of organic solvents. For example solutions of our local anesthetics in ethyl succinate, ethyl pimelate, or similar nontoxic organic esters may be employed for subcutaneous injection. In other cases these local anesthetics may be utilized in the form of a spray composition wherein a solution of the product in a carrier, such as benzyl alcohol, is employed. In most instances it is desirable that these products be used as local anesthetics in the form of their inorganic acid or organic acid water soluble salts. Suitable acid salts include those of hydrochloric, phosphoric, sulfuric, boric, lactic, nitric, alpha-hydroxy butyric, gluconic, tartaric, citric, acetic, salicyclic, phthalic, benzoic, higher fatty acids such as oleic, lauric, stearic, salts of phenol, etc.

The 1,3-dipyridyl-2-alkylol substituted guanidines, when used as local anesthetics, are characterized by a highly effective anesthetic action of good duration and requiring a very small mineral anesthetic dose. The anesthetic property of this type compound was not heretofore known and constitutes a new and entirely unexpected property. The experiments and tables which follow illustrate the superiority of certain representative 1,3-disubstituted guanidines as compared with the well-known local anesthetic cocaine.

For testing surface anesthesia the rabbit cornea was employed. The compound under test was dissolved in the form of its hydrochloride or sulfate salts. The conjunctival sac was then filled with the test solution and the latter was allowed to remain in contact with the cornea for 1 minute. The anesthetic was then removed by drainage and the anesthetic threshold, the mydriatic properties, the duration of action and the irritation of solutions at various concentrations were determined.

The irritating properties of the individual compounds were estimated by careful observation of the rabbit eye. The ratings assigned in the table are a composite index of erytheme, edema, hyperemia and clouding and pitting of the cornea and were graded from one to four plus; ± indicating slight or insignificant irritation.

An index of anesthetic potency greater than unity represents activity greater than that of cocaine and an index of less than unity represents a fraction of activity as compared to that of cocaine.

are effective anti-oxidants for oils and soaps and prevent incipient deterioration and rancidity therein.

In addition to the symmetrical disubstituted guanidines above mentioned various others may be condensed with alkylene oxides. Among such compounds, the di-alkyl guanidines include 1,3-dimethyl guanidine, 1,3-diethyl guanidine, 1,3-diamyl guanidine, 1,3-dioctyl guanidine, 1,3-didodecyl guanidine, and the like. Corresponding symmetrical disubstituted aryl guanidines such as diphenyl, di-tolyl, dixylyl, dinaphthyl and the like, and symmetrical disubstituted heterocylic guanidines such as 1,3-dithiazyl guanidine, 1,3-dipyrimidyl guanidine, and the like, can also be reacted with alkylene oxides such as ethylene oxide, glycidol, glycosans and the like to give commercially useful condensation products.

Thus, examples of specific compounds the use of which is contemplated herein are the reaction products of 1,3-dipyridyl guanidine and ethylene oxide or glycidol or of 1,2- or 1,3-propylene oxide and the like; or the reaction products of 1,3-dipyridyl guanidine and similar alkylene oxides.

It is to be understood that the examples given herein are merely specific embodiments of this invention and that the latter is to be broadly construed within the purview of the appended claims.

Table

| Compound | Minimal effective conc. in percent | Onset of anesthesia | Duration in min. | Mydriatic effect on pupil | Irritation | Index of activity | Remarks |
|---|---|---|---|---|---|---|---|
| 1,3-dipyridyl-2-ethylol guanidine lactate. | 0.1-0.25 | Rapid | 20 min. with 1% sol. | None | None | 2.0 | Anesthesia of excellent quality. |
| 1,3-dipyridyl-2-(2-butylol-1) guanidine HCl. | 0.125-0.25 | ...do..... | 25 min. with 1%. | ......do......... | ±for 2%,(−) for 1% | 2.0 | Anesthesia of moderate duration of good quality. |
| Cocaine | 0.25-0.5 | ...do..... | 22 min. with 1%. | Dilates pupil | +1 with 1% | 1.0 | Anesthesia of moderate duration, rapid onset, irritating, cacises, pitting and drying of cornea. |

In general, the compounds mentioned, in addition to those specifically illustrated in the table, possess desirable and unexpected pharmacological action. The activity, of course, differs in degree from compound to compound but it is strikingly significant that all of the diaryl substituted guanidines disclosed herein possess anesthetic properties.

These products, particularly those having waxy or paste-like properties are useful assistants in the textile, leather, paper, rubber, lacquer and similar industries. Some of these compounds herein described, particularly the alkylol guanidines which are disubstituted with short chain hydrocarbon radicals such as dimethyl, diethyl, dibutyl and the like, as well as the diaryl radicals,

We claim:
1. A composition comprising a substance selected from the group consisting of dipyridyl-2-alkylol guanidines and the salts thereof prepared for use as an anaesthetic.
2. 1,3 dipyridyl-2-alkylol guanidine prepared for use as an anaesthetic.
3. An acid salt of a 1,3-dipyridyl-2-alkylol guanidine prepared for use as an anaesthetic.
4. An aqueous solution of an acid salt of a 1,3-dipyridyl-2-ethylol prepared for use as an anaesthetic.
5. An aqueous solution of an acid salt of a 1,3-dipyridyl-2-(2-butylol-1) guanidine prepared for use as an anaesthetic.

WALTER P. ERICKS.
JAMES H. WILLIAMS.